United States Patent
Kawecki et al.

(12)

(10) Patent No.: US 6,259,777 B1
(45) Date of Patent: *Jul. 10, 2001

(54) BILLING SYSTEM AND METHOD FOR DATABASE-QUERIED COMMUNICATIONS SERVICES

(75) Inventors: Michael Anthony Kawecki, Belle Mead; Michael Anthony Scott, Matawan, both of NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,705

(22) Filed: Jan. 28, 1999

Related U.S. Application Data
(60) Provisional application No. 60/113,909, filed on Dec. 28, 1998.

(51) Int. Cl.$^7$ ................................................. H04M 15/00
(52) U.S. Cl. ..................... 379/114; 379/113; 379/116; 379/119; 379/133; 379/135
(58) Field of Search .................. 379/111–114, 119–120, 379/121, 135, 133–134, 201, 115–116

(56) References Cited

U.S. PATENT DOCUMENTS

| | | | |
|---|---|---|---|
| 5,003,584 | * 3/1991 | Benyacar et al. | 379/119 |
| 5,822,411 | * 10/1998 | Swale et al. | 379/111 |

OTHER PUBLICATIONS

"ISDN Architecture" by R. T. Roca, AT&T Technical Journal, vol. 65, No. 6, Issue 1, pp. 1–55, Jan./Feb. 1986.

"The 5ESS Switching System" by K. E. Martersteck, et al.,AT&T Technical Journal, vol. 64, No. 6, part 2, pp. 1305/1564, Jul./Aug. 1985.

* cited by examiner

*Primary Examiner*—Duc Nguyen

(57) ABSTRACT

A communications system is designed to create a sub-account AMA record for each transaction requested by a caller within a single 900-number call after an initial transaction has been processed. Such sub-account record includes the rate charged for each transaction. Such rate may vary from transaction to transaction and may even negate all charges for an entire call. The sub-account record permits an itemized bill to be created for all transactions processed during such call.

10 Claims, 3 Drawing Sheets

| 1 | NEW RATE |
| --- | --- |
| 2 | FLAT RATE |
| 3 | PREMIUM CHARGE |
| 4 | PREMIUM CREDIT |
| 9 | FREE CALL |

BILLING SYSTEM AND METHOD FOR DATABASE-QUERIED COMMUNICATIONS SERVICES

This application claims the benefit of U. S. Provisional Application, Ser. No. 60/113,909 filed Dec. 28, 1998.

TECHNICAL FIELD

This disclosure relates to communications systems and, more particularly, to a billing system and method for pay-per-call database-queried communications services.

BACKGROUND

Pay-per-call database-queried communications services, better known in the United States as 900-number communications services, or pay per-call communications services, allow callers to get access to distinct or selective information that is typically unavailable to the general public. The sponsor of the 900-number service typically delivers the information requested by a caller via a Voice Response Unit (VRU) or a live attendant. While in the past, most of the information delivered via 900-number services was primarily entertainment-centric, recently 900-number services are increasingly being used to facilitate delivery of a wide spectrum of commercial information, such as software product support, high-level technical consulting services, credit verification, and employee dial-in conferences and training, to name a few.

In spite of these commercial developments, until recently, pay-per-call sponsors who use 900-number service as a vehicle for information delivery were dissatisfied with the inflexibility of the system. For example, a software engineer who is in the midst of providing consulting services regarding a software package cannot easily put a caller on hold to verify certain specifications regarding the software, since the caller would have to pay for "un-rendered" services while on hold. Similarly, the engineer could not transfer the call to another engineer who is an expert in a particular aspect of the software and therefore, commands higher fees for his or her consulting services.

In response to this problem, AT&T introduced the Sponsor Flexible Rating feature, also known as Vari-A-Bill feature, that allows a sponsor to change the rate at which a call is charged at any point during the call by sending a signal to the communications system of the carrier. In essence, the Vari-A-Bill feature sets forth a rating structure wherein a user can enter different rate codes for various situations. An illustrative rate code table is shown in FIG. 4. In the rate code table of FIG. 4 a code of "1" indicates that a new rate should apply to the call from the time the code is received by the switch. The new rate is a rate that is higher or lower than the preceding rate heretofore applied to the call. A code of "2" indicates that a flat rate should apply for the remaining time of the call. The code of "2" may also be used by a sponsor to sell products that are charged to a telephone bill as opposed to a credit card bill. A code of "3" signals that a pre-determined premium charge should be added to the fee charged for the call while a code of "4" is used to signal that a pre-determined amount should be deducted from the fee charged for the call. A premium charge is a positive rate that is applied to the call in addition to the preceding rate after the sponsor's signal is received by the communications system. Conversely, a premium credit is a negative rate that is applied to the call in addition to the preceding rate after the sponsor's signal is received by the communications system. Finally, a code of "9" negates all charges for the entire length of the call.

In practice, when a user enters the code for a different rate, such rate overrides the preceding rate for the remainder of the call or for the entire length of the call. This is accomplished by overwriting the preceding rate with the different rate in a sub-record created in the billing record also known as an Automatic Message Accounting (AMA) record.

In spite of these technical advances, however, prior art billing systems for 900-number transactions still lack the flexibility desired by pay-per-call sponsors. For example, the Vari-A-Bill feature allows a single rate change per call. Specifically, pay-per-call billing systems are still unable to generate a single bill to be tendered to a 900-number caller who wish to receive within a single call consulting services regarding multiple products. This is because the Vari-A-Bill feature allows a single sub-record to be created and thus prevents a sponsor to apply more than two rates within a single call. Hence, when a sponsor takes a caller off hold, the sponsor cannot resume the original rate for the call. Another shortcoming of prior art pay-per-call billing systems is their inability to generate an itemized bill for multiple transactions within a single call.

As a result of these deficiencies of the prior art, the pay-per-call communications service industry has been facing some stiff competition from service providers who prefer to use the Internet as a vehicle to deliver selective information. Thus, the pay-per-call communications service industry sorely needs a flexible billing system that permits processing of multiple transactions within a single call and is capable of generating itemized bills for such transactions.

SUMMARY

The present disclosure is directed to a method and a system that allow a sub-account AMA record to be created for each changed rate entered by a user within a single call thereby permitting an itemized bill to be created for all transactions processed during such call.

In an embodiment of the principles disclosed herein, when a caller dials a 900-number to access the selective information platform of a sponsor, a conventional billing record is created. Such billing record typically contains fields such as the calling and called party numbers, the date and time of day, and the rate for the call. When the sponsor enters a first code to change the rate of the call, a first sub-record is added to the billing record. The rate change initiated by the sponsor may be due to factors, such as the sponsor having to place the caller on hold, a request by the caller for a different set of selective information or ordering of a new product or service by the caller. When the sponsor enters a second code to change the rate of the call, a second sub-record is added to the billing record. The second rate change may be initiated by the caller in response to conditions such as taking a call off hold, or ordering of a new product or service by the caller. The process of creating and adding new sub-records continues until termination of the call. Thereafter, a bill is generated with each sub-record being represented as a line item on the bill.

According to one aspect of the principles disclosed herein, each code entered by the sponsor is forwarded to the originating switch of the communications system via a data (D) channel of an Integrated Services Digital Network (ISDN) Primary Rate Interface (PRI) trunk that couples the sponsor's premises equipment to the carrier's communications network. Each sub-record is created when the code associated therewith is received at the communications switch of the carrier.

Advantageously, implementation of the principles disclosed herein would allow a sponsor to store multiple sound files that can be retrieved by a 900-number caller at different rates within a single call.

DETAILED DESCRIPTION

Figure 1:
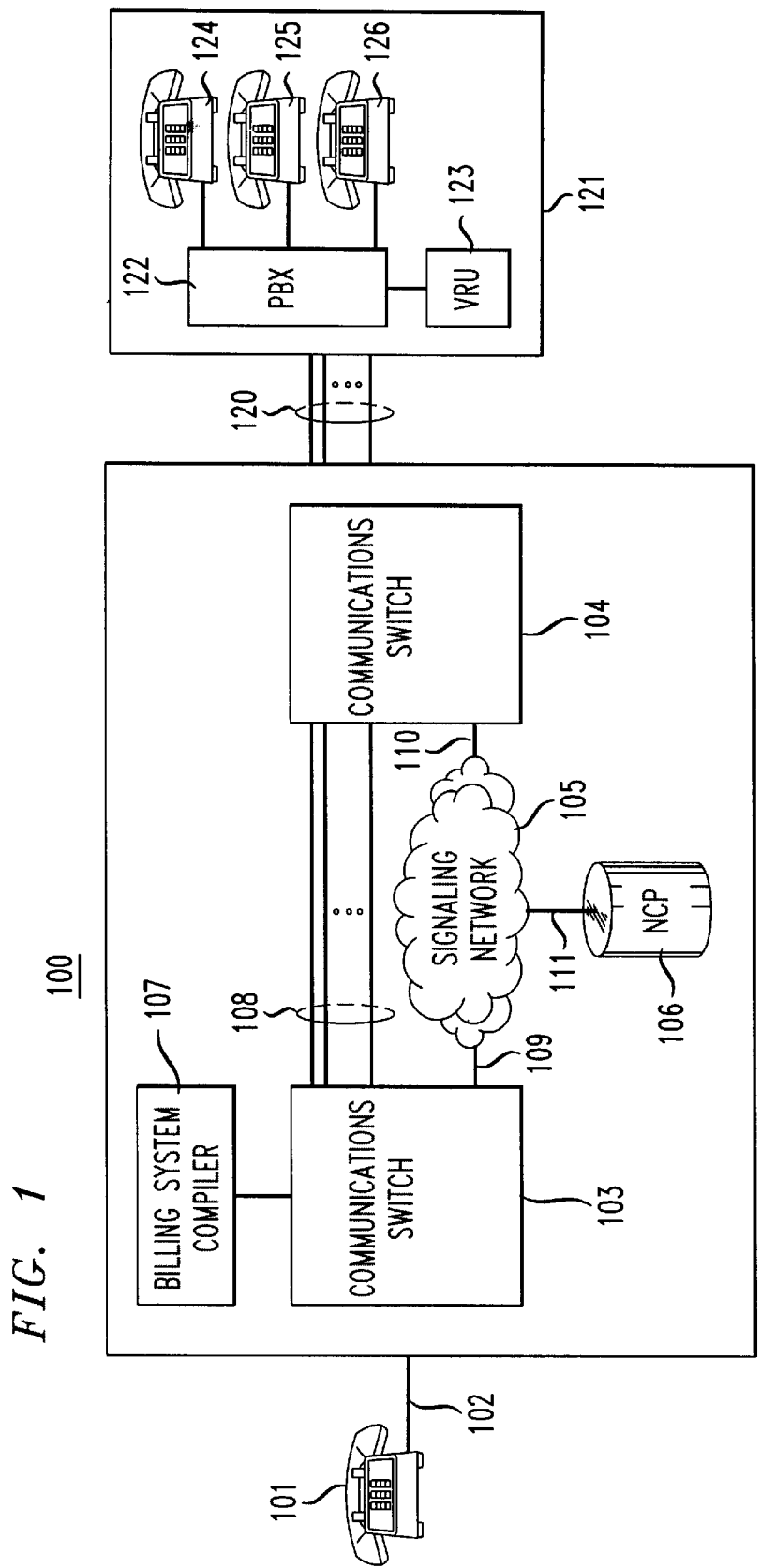
FIG. 1 shows in block diagram format a communications network arranged in accordance with the principles disclosed herein to process multiple transactions within a single call.

FIG. 1 shows in block diagram format a communications network 100 that is arranged to provide communications services to a calling party at telephone set 101 for access to the premises-based communications system 121 of a 900-number sponsor. As is well known in the art, when a communications services subscriber dials the 900-prefix telephone number of a sponsor, the dialed telephone number is received at switch 103. The dialed digits are transmitted via Plain Old Telephone System (POTS) facility 102 and possibly via a local switch (not shown) prior to being received by communications switch 103. Upon receiving the dialed digits, communications switch 103 uses such digits to form a call processing message that is forwarded to NCP 106 via signaling link 109, signaling network 105 and signaling link 111. Signaling network 105 is comprised of a plurality of interconnected packet switching nodes that route call processing messages to their appropriate destinations according to a defined protocol, such as the well-known Common Channel Signaling (CCS) protocol.

The call processing message includes a query to Network Control Point (NCP) 106 to translate the 900-prefix number dialed by the caller to a routing number. As is known in the art, an NCP is a processor-controlled database management system which stores a sponsor's routing information such as a translation table that maps a 900-number to a routing number. Such routing number may be a dialable number of the form NXX-XXX-XXXX, where N is a digit between 2 and 9 and X may be any digit. Alternatively, the routing number may be a non-dialable number of the form SSS-TTT-XXXX where X is any digit, SSS is an identification number for a communications switch, such as communications switch 104, and TTT is an identification number for a trunk connecting a premises-based communications system to network 100. When NCP maps in a translation or routing table the 900-prefix number to the routing number, such routing number is forwarded to communications switch 103 which proceeds to complete the call to the destination indicated in the routing number.

In the present example, the call is routed to switch 104 that proceeds to complete the call to premises-based communications system 121 via trunk 120 that is a Primary Rate Interface (PRI) Integrated Services Digital Network (ISDN) facility. As is well known in the art, one of the key attributes of the ISDN PRI standard is the support for twenty-four 64 Kilobits per second (Kbps) channels over a standard DS-1 facility. Of particular importance is the portion of the standard requiring the use of twenty-three of those channels—called bearer (B) channels—to carry voice or data information and one common channel—called data (D) channel—to exclusively carry signaling information for the other twenty-three channels. Additional information regarding ISDN standards in general, and PRI interface in particular, can be found in *AT&T Technical Journal*, Vol. 65, No. 6, Issue 1, pp. 1–55 January/February 1986.

In the present system, signaling information, such as the calling party number, is transmitted by switch 104 to premises-based communications system 121 via the D channel of trunk 120 while a call is completed over one of the B channels. Similarly, premises-based communications system 121 transmits signaling information to switch 104 that forwards such information to switch 103 via signaling network 105 and signaling link 109. Additional information regarding ISDN standards in general, and PRI interface in particular, can be found in *AT&T Technical Journal*, Vol. 65, No. 6, Issue 1, pp. 1–55 January/February 1986.

Switches 103 and 104 are processor-controlled, software-driven communications systems that are arranged to route calls to destinations specified in call setup information received from end-user devices such as analog telephone set 101. A well-known communications switch is the Lucent Technologies 5ESS® switch whose features and functionality are described in different articles published in the *AT&T Technical Journal*, Vol. 64, No. 6, part 2, pp. 1305–1564, July/August, 1985.

Premises-based communications system 121 is comprised of Private Branch Exchange (PBX) 122, Voice Response Unit (VRU) 123 and stations 124, 125 and 126. VRU 123 is arranged to execute a set of scripts that are stored in its memory (not shown). One example of such scripts is a greeting script that is executed by VRU 123 to answer an incoming call and to greet a caller with a pre-recorded voice announcement inviting a caller to enter a particular Dual Tome Multi-frequency (DTMF) in order select a particular set of information to be delivered to the caller. The DTMF signal provided by a caller is forwarded to VRU 123 via the D channel of trunk 120. Upon receiving the DTMF signal, VRU 123 selects a particular set of scripts to be executed based on such received DTMF signal. A VRU may be implemented using a suitably modified Lucent Technologies Intuity® Voice System whose architecture and features are described in an article entitled "Conversant Voice System and Applications" by Pardue et al. that was published in *AT&T Technical Journal*, Vol. 65, Issue 5, pp. 34–47, September/October 1986.

Calls completed at premises-based communications system 121 may also be directed to live attendants at stations 124, 125 and 126. Such attendants may enter DTMF codes at the dial pads of the station sets to direct signaling information to originating switch 103 via the D channel of trunk 120, as described in detail below.

Optionally, communications switching system 100 of FIG. 1 may be replaced with a computer network (not shown) that is comprised of interconnected processing nodes arranged to a) switch digital signals according to a common addressing protocol, such as the Internet Protocol (IP), and b) to deliver in audio format sound files that are stored in one or more of such processors.

Figure 2:
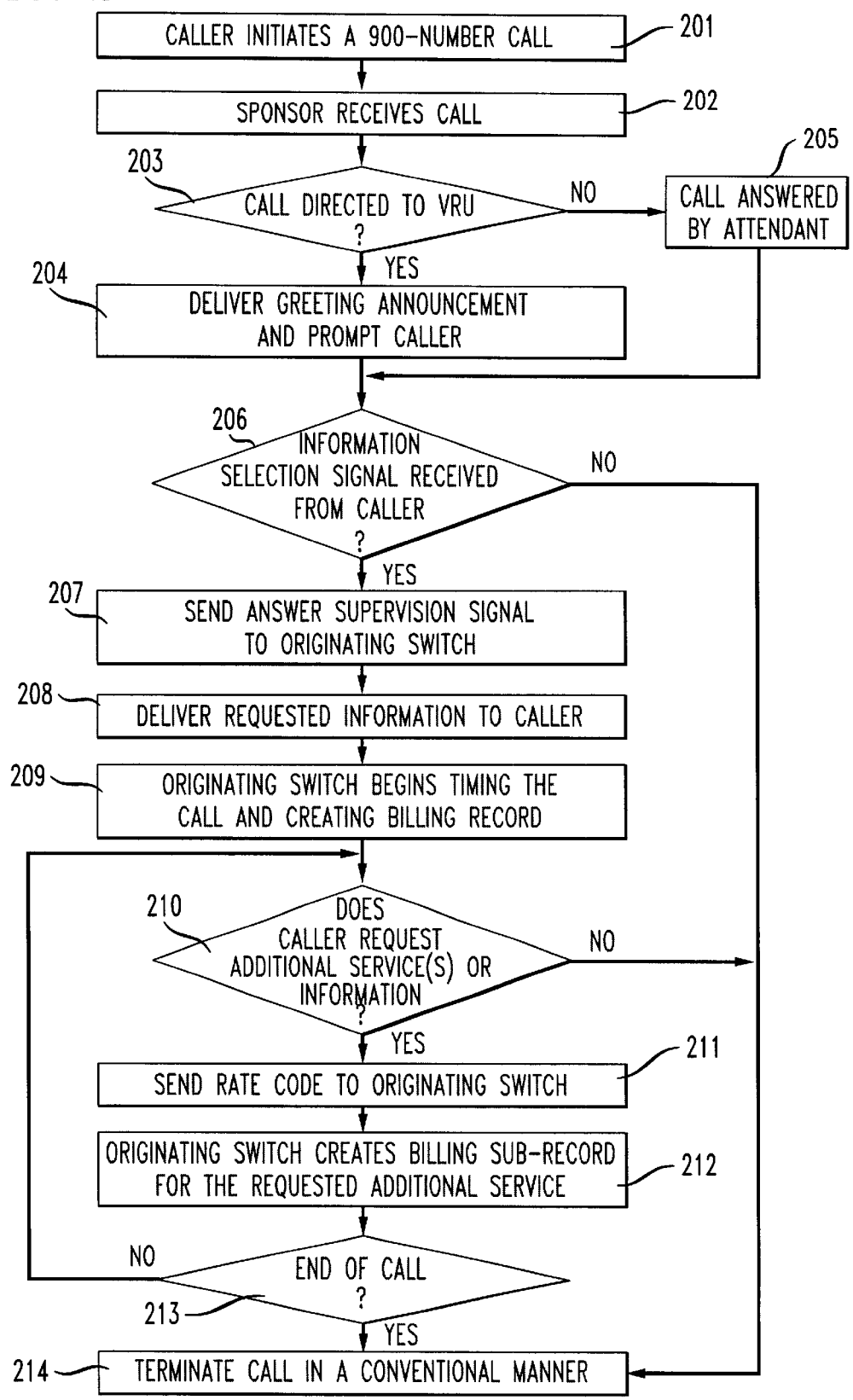
FIG. 2 illustrates programmed instructions executed by different components of FIG. 1 to implement the principles disclosed herein.

As shown in FIG. 2, the process contemplated by this disclosure is initiated in step 201 when communications switching system 100 receives call setup information for a call that is initiated by a caller and that is directed to a 900-number sponsor. The call and the call setup information are routed according to the principles described above such that the call and the call setup information are received, in step 202, by premises-based communications system 121. Upon receiving the call setup information, PBX 122 in step 203 determines, based on the received telephone number, whether the call should be directed to VRU 123 or to a live attendant at one of the telephone sets 124, 125 and 126. If the call is directed to VRU 123, as determined in step 203, VRU 123 in step 204 greets the caller with a pre-recorded announcement and prompts the caller to select a particular service or set of information. If the call is directed to a live attendant, as determined in step 203, such call is answered by the attendant in step 205 in a conventional manner. It is worth noting that step 203 can be skipped when either premises-based communications system 121 is not equipped with a VRU (i.e., all calls are answered by live attendants), or premises-based communications system 121 is not manned by live attendants (i.e., all calls are answered by the VRU). Regardless of whether the call is answered by VRU 123 or a live attendant, a preamble message is delivered to the caller informing him or her of the rate that will be applied to the call. The caller may then either terminate the call without incurring any charges, or send a signal indicative of his or her willingness to proceed with the call.

When an information selection signal is received from a caller, as determined in step 206, the attendant or VRU 123 causes an answer supervision signal to be transmitted to originating switch 103 in step 207. Typically, when a call is answered by VRU 123, the answer supervision signal is automatically transmitted to originating switch 103 when the caller enters a DTMF code on his or her dial pad in response to a prompt from VRU 123. By contrast, for calls answered by live attendants, the transmission of the answer supervision signal is typically initiated by an attendant when the caller indicates a willingness to receive one or more sets of information. Thereafter, the information requested by the caller is delivered in step 208 by VRU 123 or a live attendant, as appropriate. Almost simultaneously with the beginning of the information delivery process, originating switch 103 in step 209, starts to time the call and to create a billing record.

Figures 3, 4:
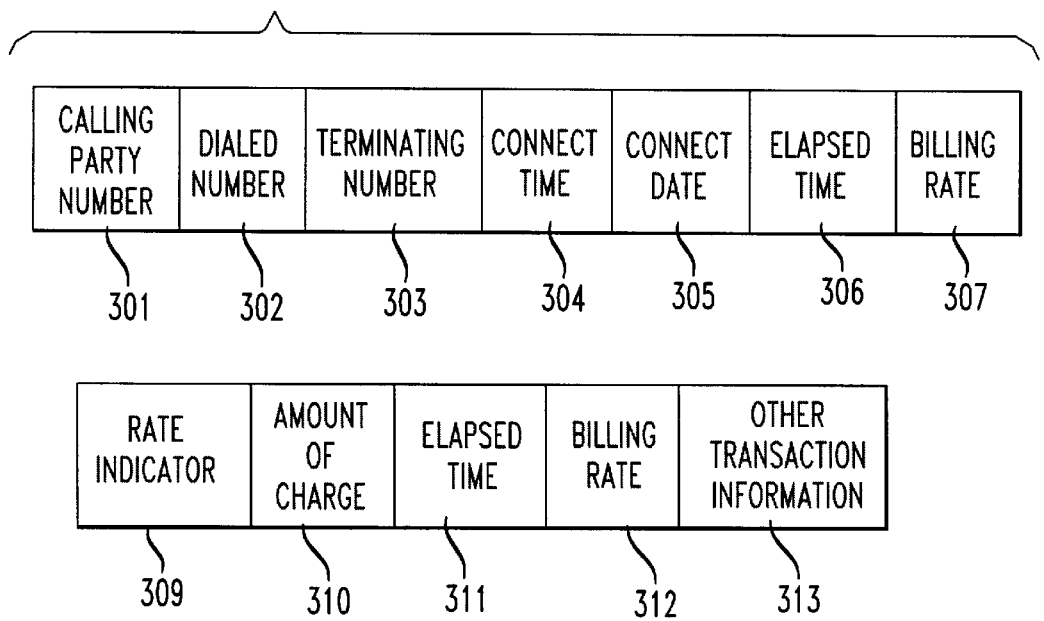
FIG. 3 is an illustrative representation of a billing record and a billing sub-record.
FIG. 4 illustrates a table for different rate codes that are used in prior art systems.

An illustrative billing record is shown in FIG. 3. The billing record of FIG. 3 includes a number of fields, such as calling party number 301, dialed number 302, terminating number 303, connect time 304, connect date 305, elapsed time 306 and billing rate 307. Calling party number 301 is the Automatic Number Identification (ANI) or the billing number of the caller. Dialed number 302 is the 900-prefix number dialed by the caller. Terminating number 303 is the POTS number or the number formulated in SSS-TTT-XXXX format by the NCP. In other words, the terminating number is the number that is translated by the NCP. Connect time 304 and Connect date 305 indicate, respectively, the time and date at which the call is completed to premises-based communications system 121. Elapsed time 306 indicates the duration of the call. Billing rate 307 specifies the rate per unit of time at which the call is billed. Elapsed time 311 dictates the duration of time between either two separate invocations of the service or an invocation of the service and termination of the call.

Referring back to FIG. 2, if the caller requests additional services or information, as determined in step 210, then VRU 123 or the live attendant, as appropriate, will cause one of the rate codes set forth in FIG. 4 to be transmitted to originating switch 103. In the case of VRU 123, transmission of the rate code is triggered by the caller sending a DTMF code to signal his/her request for additional services or information. When a live attendant answers a 900-number call, such attendant initiates transmission of the rate code when the caller's request for additional services or information is received.

Upon receiving the rate code, originating switch 103 in step 212 creates a billing sub-record for the additional service requested by the caller. Thereafter, PBX 122, in step 213, determines whether an on-hook supervisory signal is received from the caller's telephone set. If so, the call is terminated in step 214 in a conventional manner. Otherwise, 210 to 213 are repeated until PBX 122 receives an on-hook supervisory signal from the caller. It is worth noting that an additional billing sub-record will be created by originating switch 103 in every instance in which a request for additional information or services is requested by a caller. At the risk of being repetitive, we wish to reiterate that any new additional billing sub-record created will be recorded individually on the medium on which the billing record was recorded. Specifically, a new billing sub-record will not overwrite any preceding billing sub-record.

Optionally, after the call is terminated in step 214, the billing system will append all the created sub-records to the billing record to generate an itemized bill for the caller. Such itemized bill will describe among other things all the requests initiated by the caller, the date, time of such requests as well the charges, if any, associated with each request.

The foregoing merely illustrates certain aspects of the principles disclosed herein. Persons skilled in the art will be able to devise numerous arrangements which, although not explicitly shown or described herein, embody the principles disclosed herein and are within the spirit and scope of the disclosure.

What is claimed is:

1. A method implemented by a communications carrier for a) processing multiple transactions, and b) billing for the transactions within a single 900-number call, said method comprising the steps of:

completing via said carrier's communications system a 900-number call initiated by a caller and directed to a sponsor to carry out a first transaction and creating a billing record for said call, said billing record including a first field representative of a first rate at which said call is being charged;

receiving successively at said communications system a first code and a second code from said sponsor for a second transaction and a third transaction, respectively, said first code being indicative of a first wish of said sponsor to change said first rate to a second rate and said second code being indicative of a second wish of said sponsor to change said second rate to a third rate;

creating successively a first sub-record and a second sub-record for said call, said first sub-record including a second field representative of said second rate at which said call is being charged after said first code has been received and said second sub-record including a third field representative of said third rate at which said call is being charged after said second code has been received; and creating a bill for said call, said bill including a line item for each one of said first, second and third rates and respective amounts of time for which each one of said first second and third rates apply for the call.

2. The method of claim 1 further comprising the steps of:
recording the time at which said first code was received and inserting said time in said billing record.

3. The method of claim 2 further comprising the steps of:
recording the time at which said second code was received and inserting said time in said first sub-record billing record.

4. The method of claim 3 further comprising the steps of:

recording the time at which said call was terminated and inserting said time in said second sub-record billing record.

5. The method of claim 1 further including the steps of:

creating an additional billing sub-record for each additional code received from said sponsor; and generating an additional line item on said bill for each additional billing sub-record created.

6. A method for tracking multiple billing rates applied to various transactions in a single pay-per-call telephone call, comprising the steps of:

creating a plurality of sub-account records in a record, each one of said sub-account records is created for each one of a plurality of rate changes entered by a sponsor during said single pay-per-call telephone call;

creating a bill for said single call, said bill including a line item for each one of said plurality of said rate changes; and sending a rate code to a communication switch from said sponsor to indicate a change in transaction status.

7. The method of claim 6 further comprising the step of:

creating, with said communication switch, one of said plurality of sub-account records in said billing record in response to said sponsor sending said rate code.

8. The method of claim 7 further comprising the step of:

determining if a caller has requested additional services or information so as to trigger said change in transaction status.

9. The method of claim 8 further comprising the step of:

recording each one of said plurality of sub-account records separately on a medium on which said billing record is recorded.

10. The method of claim 9, wherein each one of said plurality of sub-account records does not overwrite any preceding sub-record.

* * * * *